May 31, 1960 F. M. O. FOERSTER 2,939,071
COIL ASSEMBLY FOR TESTING OF RODS OR TUBES
Filed Aug. 7, 1957
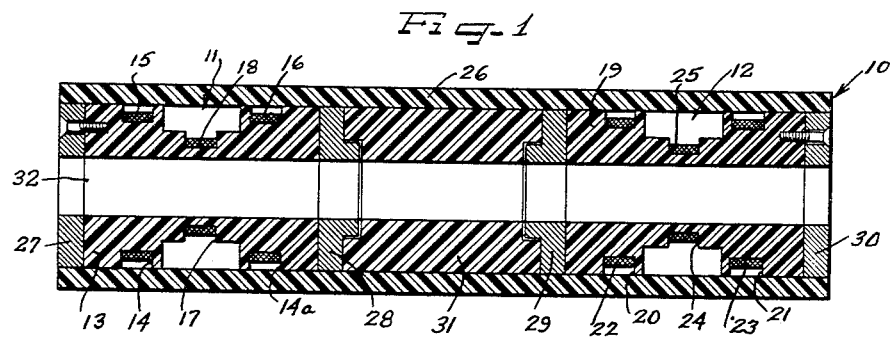
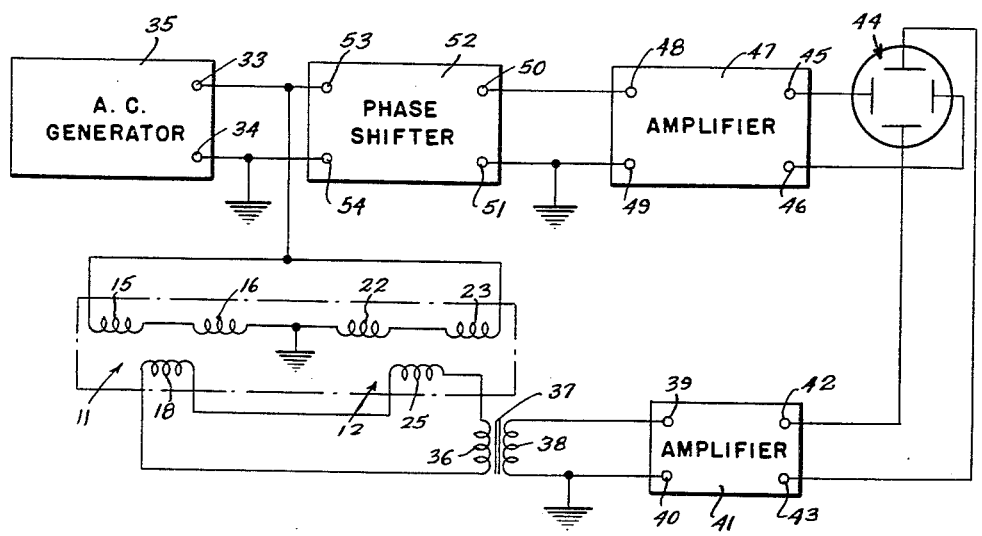
Inventor
FRIEDRICH M. O. FOERSTER

United States Patent Office 2,939,071
Patented May 31, 1960

2,939,071

COIL ASSEMBLY FOR TESTING OF RODS OR TUBES

Friedrich M. O. Foerster, Grathwohlstr. 4, Reutlinger, Germany

Filed Aug. 7, 1957, Ser. No. 676,760

4 Claims. (Cl. 324—34)

This invention relates to a coil assembly for testing of rods or tubes and more particularly to an assembly in which an elongated cylindrical object, either a rod or a tube, is placed in the magnetic field of the assembly, with cracks or other changes in physical properties being detected by the effect on the field of the coil assembly.

It has heretofore been proposed to detect cracks in rods or tubes by means of an exciting coil in surrounding relation to the rod or tube, to which an alternating current is applied, with a pair of receiver coils located underneath the exciting coil. The receiver coils are located in axially spaced relation and the outputs thereof are compared, so as to compare the magnetic characteristics of one portion of the rod or tube with a portion of the rod or tube spaced axially therefrom.

It has been found that with such an arrangement, there is a "moving-effect" such that when the rod passes through the first receiver coil, the rod is coming from a field-free space while when it passes through the second coil, the rod is coming from a region having a strong field. This results in a difference in the indication and, in addition, the difference varies with the speed of movement of the rod. In order to eliminate this "moving-effect," it has been proposed to use two coil pairs which are wound one upon the other and are connected in opposition. These coil pairs are very difficult to adjust and in addition reduce the sensitivity considerably.

The above-described type of system, and other prior systems of a similar nature, have suffered from a further disadvantage in that they have a very low penetration depth. That is, they will detect cracks which are close to the surface of the rod or tube, but cannot readily detect cracks which are located toward the center of the rod or tube.

It is therefore a primary object of this invention to provide an improved coil assembly for the testing of rods or tubes, in which the above described "moving-effect" is minimized.

A further object of this invention is to provide a coil assembly having improved penetration characteristics.

According to this invention, a coil assembly is provided which comprises two separate transformers each having primary and secondary coils, with the transformers being spaced a substantial distance apart so that the effect of one upon the operation of the other is minimized. A highly important feature of the invention is in the provision of at least one ring of conductive material between the two transformers. As the rod or tube moves from one transformer through the ring, currents are induced in the ring by any magnetization of the rod or tube, which opposes such magnetization and effectively reduces the magnetization to zero. Accordingly, as the rod or tube enters the second transformer, it is substantially completely demagnetized, and the previously described "moving-effect" is eliminated. A ring of conductive material is preferably located in advance of each transformer, so as to insure that the rod or tube will be demagnetized as it enters each transformer. The coil assembly is preferably such that it can be operated with movement of the rod or tube in either direction, and a conductive ring is hence preferably located on each end of each transformer.

According to a further feature of the invention, the transformers are of very short axial length, as compared to the diameter of the rod or tube under test. The axial length of the transformer is on the order of 2.5 times the diameter of the rod or tube and is preferably not greater than five times the diameter of the rod or tube. It has been found that with this relationship, the penetration depth is greatly increased. This advantageous effect is enhanced by the use of the conductive rings which are preferably located closely adjacent the ends of the transformers, to reduce the effective length.

The increased penetration depth, which results with a short axial length, is apparently due to the fact that the apparent permeability decreases as the length decreases, and from the decreased apparent permeability, it should be obvious that the penetration depth will increase. This arrangement has a further advantage in that it is less sensitive to permeability variations which are caused by cold working.

This invention contemplates other and more specific objects, features and advantages which will become more fully apparent from the following detailed description taken in conjunction with the accompanying drawings which illustrate a preferred embodiment and in which:

Figure 1 is a cross-sectional view through a coil assembly constructed according to the principles of this invention; and Figure 2 is a schematic circuit diagram illustrating a testing system utilizing the coil assembly of Figure 1.

Reference numeral 10 generally designates a coil assembly constructed according to the principles of this invention. The assembly 10 comprises a pair of transformers 11 and 12 of substantially identical construction. The transformer 11 comprises a coil form 13 having a pair of annular grooves 14 and 14a in which are wound portions 15 and 16 of a primary coil. The form 13 further has a groove 17 intermediate the grooves 14 and 14a and of smaller diameter in which is wound a secondary coil 18. The transformer 12 similarly comprises a coil form 19 having grooves 20 and 21 receiving portions 22 and 23 of a primary coil and a groove 24 which receives a coil 25. The coil forms 13 and 19 are mounted within a tube 26. Also mounted within the tube 26 are a first pair of rings 27 and 28 at the opposite ends of the form 13 and a second pair of rings 29 and 30 at the opposite ends of the form 19. Disposed between the rings 28 and 29 is a spacer tube 31. The rings 27–30 are preferably of a highly conductive material, most preferably steel although copper and other materials may be used.

It will be apparent from the drawing that the forms 13 and 20, the spacer tube 31 and the rings 27–30 are coaxially mounted and together they provide a generally cylindrical opening indicated by reference numeral 32, through which the rod or tube under test is passed.

Referring now to Figure 2, the portions 15 and 16 of the primary coil of the transformer 11 are connected in series, and likewise the portions 22 and 23 of the primary coil of the transformer 12 are connected in series, with the series-connected primary coil portions being connected in parallel and to the output terminals 33 and 34 of an A.C. generator 35. The secondary coils 18 and 25 are connected in series and to a primary coil 36 of a transformer 37 which has a secondary coil 38 connected to the input terminals 39 and 40 of an amplifier 41. The amplifier 41 has output terminals 42 and 43 connected to one pair of deflection plates of a cathode ray tube 44 as diagrammatically illustrated. The other pair of deflection plates of the cathode ray tube 44 are connected to output terminals 45 and 46 of an amplifier 47 having input terminals 48 and 49 connected to output terminals of an adjustable phase shifter 52 which has input terminals 53 and 54 connected to the output terminals 33 and 34 of the A.C. generator 35.

In operation, the instrument operates to compare the portion of the rod or tube under test which lies within the transformer 11 to the portion of the rod or tube which lies within the transformer 12. If the two portions of the rod or tube have identical characteristics, there will be no output from the secondary coils 18 and 25, the two being connected in phase opposition, and a line will appear on the face of the cathode ray tube 44. If, however, there is a difference in characteristics between the two portions of the rod or tube under test which lie within the transformers 11 and 12, an output will be developed in the secondary coil circuit which was amplified and applied to the cathode ray tube to produce a Lissajous figure, from which it is possible to analyze the difference in character of the two portions of the rod or tube under test. To expedite this analysis, the phase shifter 52 may be adjusted.

It will be apparent that if, for example, the tube or rod under test is moving from left to right as viewed in Figure 1, if any portion of the rod or tube is initially magnetized, such magentization will produce strong currents in the ring 27 which will produce a magnetic flux in opposition to the flux produced by the magnetized portion of the rod or tube, and the rod or tube will be substantialy demagnetized. Hence, each portion of the rod or tube will be demagnetized as it enters the transformer 11. As each portion of the rod or tube leaves the transformer 11, it will be demagnetized not only by the ring 28 but also by the ring 29 to insure that as it enters the second transformer 12, it will again be substantially completely demagnetized. Each portion of the rod or tube will again be demagnetized by the ring 30. This, in itself, is not of importance but it is desirable that the assembly be usable with movement of the rod or tube in either direction. In addition, the rings are within the fields of the transformers, and it is highly desirable, if not essential, that the transformers be of substantially the same construction.

It will be noted that the transformers have a very short axial length, on the order of 2.5 times the diameter of the rod or tube under test. Preferably, the axial length should not exceed five times the diameter of the rod or tube under test. The effective axial length is, of course, further reduced by the use of the rings 27–30. The advantages of the short axial length are pointed out above. It may be noted that this has a further advantage in that it is possible to test closer to the ends of the rods or tubes.

The division of the primary windings into two portions with the secondary coils therebetween is of importance in obtaining a symmetrical construction. It is of further advantage to have the secondary coils of smaller diameter than the primary coils, as illustrated, to obtain better penetration.

It may be noted that the system may be operated at any desired frequency. It is possible to use 25, 50 or 60 cycle alternating current, in which case the primary coils and the phase shifter may be connected to a power line. However, when it is desired to test rods or tubes moving at a fast rate, it is desirable to increase the frequency of operation. In such a case, the A.C. generator may be in the form of a vacuum tube oscillator.

It should further be noted that the system is not limited to the testing of rods or tubes of magnetic material and may be used to test any conductive materials. It may, for example, be used to test copper rods or tubes.

It will be understood that modifications and variations may be effected without departing from the spirit and scope of the novel concept of this invention.

I claim as my invention:

1. In apparatus for testing elongated cylindrical objects, generally tubular coil form means arranged to receive the object to be tested, a first transformer comprising primary and secondary coils wound on said coil form means, a second transformer comprising primary and secondary coils wound on said coil form means in axially spaced relation to said primary and secondary coils of said first transformer, means for applying an alternating current to said primary coils, at least one ring of conductive material between said transformers.

2. In apparatus for testing elongated cylindrical objects, generally tubular coil form means arranged to receive the object to be tested, a first transformer comprising primary and secondary coils wound on said coil form means, a second transformer comprising primary and secondary coils wound on said coil form means in axially spaced relation to said primary and secondary coils of said first transformer, means for applying an alternating current to said primary coils, a pair of rings of conductive material located in axially spaced relation between said transformers and in closely spaced relation to the adjacent ends of said transformers.

3. In apparatus for testing elongated cylindrical objects, generally tubular coil form means arranged to receive the object to be tested, a first transformer comprising primary and secondary coils wound on said coil form means, a second transformer comprising primary and secondary coils wound on said coil form means in axially spaced relation to said primary and secondary coils of said first transformer, means for applying an alternating current to said primary coils, a pair of rings of conductive material located in axially spaced relation between said transformers and in closely spaced relation to the adjacent ends of said transformers, and a second pair of rings respectively located in closely spaced relation to the other ends of said transformers.

4. In apparatus for testing elongated cylindrical objects, generally tubular coil form means arranged to receive the object to be tested, a first transformer comprising primary and secondary coils wound on said coil form means, a second transformer comprising primary and secondary coils wound on said coil form means in axially spaced relation to said primary and secondary coils of said first transformer, means for applying an alternating current to said primary coils, and a plurality of rings of conductive material disposed in coaxial relation to said coil form means with rings being located in closely spaced relation to both ends of each transformer to limit the effective axial lengths of the transformers.

References Cited in the file of this patent

UNITED STATES PATENTS

| | | |
|---|---|---|
| 2,065,119 | Davis | Dec. 22, 1936 |
| 2,102,451 | Zuschlag | Dec. 14, 1937 |
| 2,237,254 | Broekhuysen | Apr. 1, 1941 |
| 2,489,920 | Michel | Nov. 29, 1949 |
| 2,550,736 | Tricebock | May 1, 1951 |
| 2,673,613 | Irwin | Mar. 30, 1954 |